July 7, 1970 J. J. KOTTE ET AL 3,519,184

FILM TRANSPORT DEVICE FOR FILM PROJECTOR

Filed Sept. 27, 1967 2 Sheets-Sheet 1

INVENTORS
JAN J. KOTTE
BERNARDUS J. KUPPENS
BY
Frank R. Trifari
AGENT

FILM TRANSPORT DEVICE FOR FILM PROJECTOR

Filed Sept. 27, 1967 2 Sheets-Sheet 2

INVENTORS
JAN J. KOTTE
BERNARDUS J. KUPPENS
BY
AGENT

United States Patent Office 3,519,184
Patented July 7, 1970

1

3,519,184
FILM TRANSPORT DEVICE FOR FILM PROJECTOR

Jan Jacob Kotte and Bernardus Johannes Kuppens, Emmasingel, Eindhoven, Netherlands, assignors, by mesne assignments, to U.S. Philips Corporation, New York, N.Y., a corporation of Delaware Filed Sept. 27, 1967, Ser. No. 670,983
Claims priority, application Netherlands, Sept. 30, 1966, 6613814
Int. Cl. G03b *1/24*
U.S. Cl. 226—83 7 Claims

ABSTRACT OF THE DISCLOSURE

An improved device for transporting and guiding film in a film projector, including a pressure pad and a sprocket wheel having corresponding curved running surfaces, the pad being accurately positionable both radially and axially relative to the wheel, and being removable radially before axially to prevent damage to the running surfaces, the sprocket wheel teeth, and film therebetween.

This invention relates to a device for transporting and guiding a film in a film projector, comprising a sprocket wheel rotatably arranged in a bearing support and a pressure pad co-acting with the sprocket wheel and by means of which the film to be projected is held in the teeth of the sprocket over part of the periphery thereof.

In a known device of this kind, the pressure pad is made adjustable relative to the sprocket wheel in order to obtain accurate positioning of the pad relative to the sprocket wheel. The pressure pad is adjusted so that, on the one hand, the teeth of the sprocket can rotate clear of the pad and, on the other hand, a clearance equal to two or three times the thickness of the film exists between the running surfaces of the sprocket wheel and the pad. The pressure pad is initially adjusted in the factory which delivers the projector and afterwards at the area where the projector is arranged, this adjustment requiring a judicious use of tools. The pressure pad on which dust originating from the film deposits has to be regularly cleaned, whereafter readjustment is necessary.

An object of the invention is to provide a construction which has been improved in such manner that the required accurate position of the pressure pad relative to the sprocket wheel is obtained automatically without any adjustment and without the use of any tool.

According to the invention, to this end, a device of the kind mentioned in the preamble is characterized in that the pad is arranged on a machined surface of the bearing support by means of a snap connection and that the machined surface constitutes a reference surface for determining the accurate position of the pad relative to the sprocket wheel in a radial direction, the bearing support having an abutment which, in co-action with an abutment surface of the pad, ensures accurate positioning in an axial direction.

The pressure pad may be manufactured within narrow tolerance limits on (a) the distance between the surface by which the pad bears on the reference surface and the surfaces co-acting with the running surfaces of the sprocket wheel, and (b) the position of the abutment surface, such that the required accurate position of the pressure pad may be obtained by simply placing the pad on the reference surface and against the abutment of the bearing support. The snap connection by means of which the pad is secured to the bearing support, affords the advantage that the pad can be arranged without using tools and is readily removable for cleaning purposes and, if desired, exchangeable. The easy exchangeability of the

2 pad is advantageous more particularly in cases where the device is used in a film projector which is designed for the projection of films of two different widths, for example, 35 mms. and 70 mms., and which utilises different kinds of pads which are matched to the width of film. The exchangeability of the pad can also be utilised to make the pad fulfill a switching function, and for this purpose the pad may be provided with a cam or recess which, upon placing the pad on the bearing support, determines the position of a selector switch which is present in the projector for adjusting electric circuits to be used with the film to be projected, such as, the circuit of a magnetic sound scanner.

In a suitable embodiment of the invention the snap connection comprises resilient means which exert a radially-directed force urging the pad against the reference surface, together with an axially-directed force urging the pad against the abutment of the bearing support for the purpose of determining the accurate position thereof in the axial direction. It is thus ensured that the required accurate position of the pressure pad is automatically adjusted and also maintained in operation.

According to another embodiment of the invention, the reference surface is additionally provided with two cams which co-act with lateral projections of the pad for locking it in the axial direction. The presence of the cams makes it necessary for the pad to be lifted over the cams upon being placed in position or removed, so that the pad is prevented from contacting the teeth of the sprocket. One of the cams may furthermore be used as a temporary support for the pad upon introducing a new film, during which operation the pad, being lifted and slightly shifted sideways, is supported on the cam by the action of the resilience of the snap connection.

The invention also relates to a pressure pad such as used in the device according to the invention and which is characterized by a surface of engagement by which the pad can be supported on a reference surface of the bearing support and by an abutment surface which ensures the accurate position of the pad relative to a sprocket wheel co-acting therewith, in the axial direction.

In order that the invention may be readily carried into effect it will now be described in detail, by way of example, with reference to the accompanying diagrammatic drawings, in which.

Figure 1:
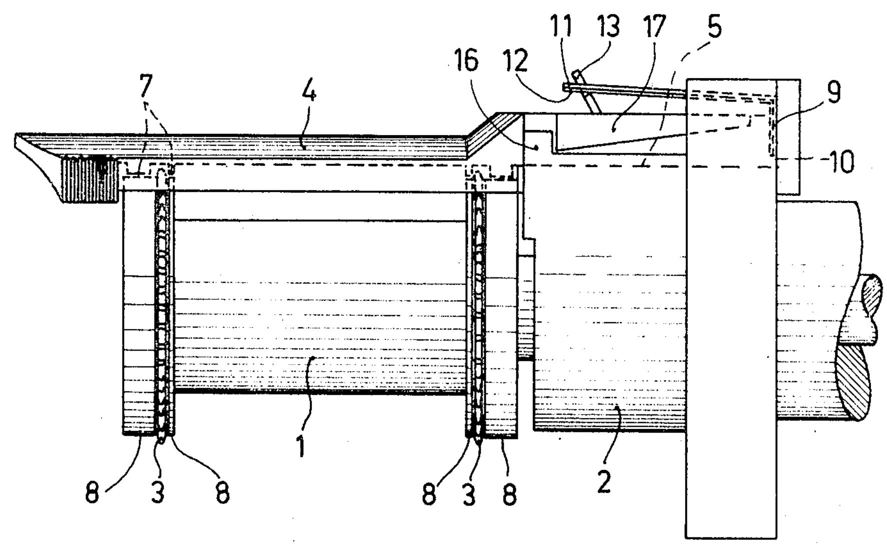
FIG. 1 is a side view of one embodiment of the invention.
Figure 2:
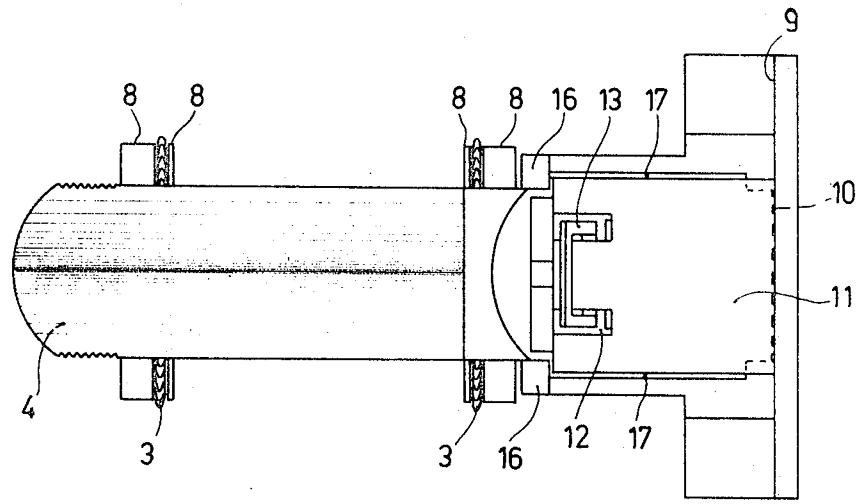
FIG. 2 is a plan view of the device of FIG. 1.

A device as shown in FIGS. 1 and 2, for transporting and guiding a film in a film projector comprises a sprocket wheel 1 which is rotatably journalled in a bearing support 2 and, in the present example, provided with two gear rims 3 by means of which a film to be projected can be transported. A pressure pad 4 ensures that the film is held in the teeth of the sprocket over part of the periphery thereof.

Figure 4:
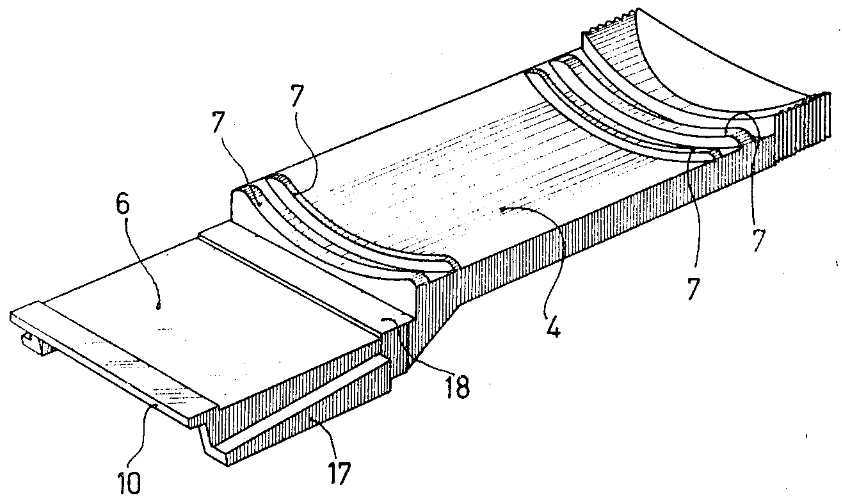
FIG. 4 is a perspective view on the bottom of the pressure pad of FIG. 3.

The bearing support 2 has a machined surface 5 which is formed as a flat surface in the present embodiment and serves to support the pad 4 which for this purpose is provided with a surface of engagement 6 (see FIG. 4). The machined surface 5 ensures a required distance between curved surfaces 7 of the pad and running surfaces 8 of the sprocket wheel 1, which distance must be equal to two or three times the thickness of the film, the machined surface 5 thus forming a reference surface for determining the accurate position of the pad relative to the sprocket wheel in a radial direction. In order to ensure that the teeth 3 of the sprocket 1 can rotate clear of the pad it is also necessary to ensure the accurate position of the pad in the axial direction. This is achieved by an abutment 9 on the bearing support 2, which co-acts with an abutment surface 10 of the pad. In the present example, the abutment surface 10 is formed by the back of the pad.

Figure 3:
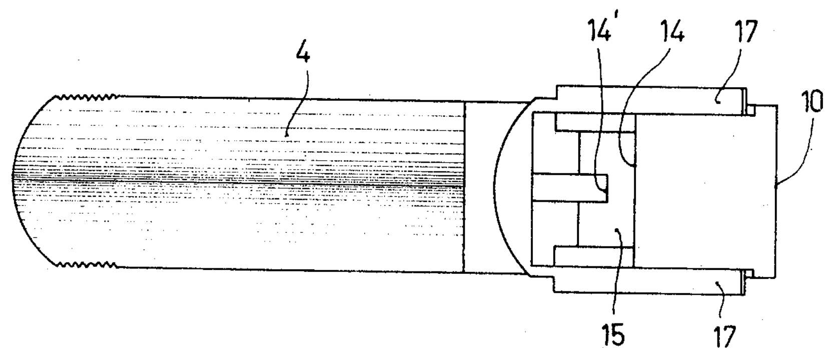
FIG. 3 is a plan view of a pressure pad such as used in the device of FIGS. 1 and 2.

The pad 4 is fixed on the reference surface 5 of the bearing support by means of a snap connection. This snap connection comprises two leaf springs 11 and 12, located one on the other and mounted above the surface 5, and also a tilting frame 13 suspended on the upper spring 11, which frame can co-act with boundary walls 14, 14' of a recess 15 (FIG. 3) formed in the upper surface of the pad, in such manner that the frame is tilted against the force of the springs 11 and 12 when the pad is slid between the springs 11, 12 and the surface 5, or is removed. In the mounted condition of the pad the frame 13 urges in the axial direction against the rear boundary wall 14 of the recess in the pad due to the action of the springs 11 and 12, in such manner that the rear surface 10 of the pad engages the abutment 9 of the bearing, thus ensuring the accurate position of the pad in the axial direction. The force exerted by the springs 11 and 12 also includes a radially-directed component which urges the pad against the reference surface 5.

The reference surface is provided with two cams 16 which co-act with lateral projections or follower elements 17 of the pad for locking it in the axial direction. Due to the presence of the cams 16, the pad cannot be slid between the springs 11, 12 and the surface 5 or removed therefrom in a true axial direction. In order to be able to pass along the cams, the pad will therefore have to be introduced or removed at an angle to the axial direction of the sprocket wheel, thus preventing the pad from sliding along the teeth, which might cause damage to the pad and/or the teeth. For introducing or removing the film, the pad can be lifted and slightly shifted sideways until a supporting surface 18 thereof (FIG. 4) comes to bear on one of the cams 16 of the bearing support, in which position the pad is held by the force of the springs 11 and 12.

It should be noted that the invention is not confined to the embodiment above described and shown. When used in 8 or 16 mm. film projectors the sprocket wheel may, for example, be provided with one gear rim or, when used in projectors designed for projecting films of two different widths, the sprocket wheel may have four gear rims, the inner pair serving for the movement of the narrow film and the outer pair for the movement of the broad film. The reference surface 5 can be curved instead of flat, the portion of engagement 6 of the pressure pad then being curved correspondingly.

What is claimed is:

1. In a device for transporting and guiding film in a film projector, including a sprocket wheel and a pressure pad having corresponding curved running surfaces, the pad being movable to and from its operative position relative to the wheel such that their corresponding surfaces are closely adjacent, the sprocket wheel also having teeth on a portion of its periphery and an axle rotatable in a bearing support means, the improvement in combination therewith, comprising:

(a) 1st and 2nd reference surfaces on the bearing support means;

(b) 3rd and 4th reference surfaces on the pad for contacting and cooperating with said 1st and 2nd surfaces respectively, to accurately position the running surfaces of the pad and sprocket in the radial and axial directions respectively;

(c) a resilient connection means urging the pad's 3rd and 4th surfaces respectively radially and axially against said 1st and 2nd surfaces; and (d) cam and follower elements of a sub-assembly, one of said elements being disposed on the pad and the other element on the support, this sub-assembly permitting the pad to be removed axially away from the sprocket wheel only after being moved generally radially, to prevent relative and contacting axial motion of and damage to the running surfaces, sprocket teeth and film.

2. A device as defined in claim 1 wherein said connection means comprises:

(a) a spring having a base secured to the support and a remote part, and (b) a frame secured to and extending from the pad and engaged by remote part of the spring.

3. A device as defined in claim 2 wherein said spring is a generally L-shaped leaf spring, the remote part being one leg of the L oriented generally parallel to the sprocket wheel axis, and the frame extending at an angle less than 90 degrees relative to said axis, whereby the spring in engaging the element, urges same both radially inward and axially.

4. A device as defined in claim 1 wherein said cam means comprises a projection on the support extending generally radially outward, permitting the portion of the pad having the running surface to be pivoted about an axis normal to the radially spaced from the sprocket axis, before it is moved relatively axially.

5. A device as defined in claim 1 wherein said pressure pad is removable and separable from said device.

6. A device as defined in claim 1 wherein said 1st reference surface is a flat machined surface and the 2nd reference surface corresponds thereto.

7. A device as defined in claim 6 wherein the radial distances (a) from the axis of the sprocket wheel and the bearing (i) to the wheel's running surface and (ii) to the 1st reference surface and (b) between said 1st and running surfaces, are predetermined such that the corresponding running surfaces will be spaced apart a distance slightly greater than the film thickness.

References Cited

UNITED STATES PATENTS

| | | | |
|---|---|---|---|
| 2,639,147 | 5/1953 | Fairbanks | 226—82 |
| 2,674,454 | 4/1954 | Mennecke | 226—83 |

RICHARD A. SCHACHER, Primary Examiner